April 21, 1970 D. J. SAVAGE 3,508,075

SIGNAL PROCESSING APPARATUS AND METHOD FOR FREQUENCY TRANSLATING SIGNALS

Filed May 8, 1967 3 Sheets-Sheet 1

INVENTOR.
DONALD J. SAVAGE

By [signature]
B. Frederick Buchan Jr.
ATTORNEYS

INVENTOR.
DONALD J. SAVAGE
BY
ATTORNEYS

April 21, 1970 D. J. SAVAGE 3,508,075

SIGNAL PROCESSING APPARATUS AND METHOD FOR FREQUENCY TRANSLATING SIGNALS

Filed May 8, 1967 3 Sheets-Sheet 3

INVENTOR.
DONALD J. SAVAGE

By [signature]
ATTORNEYS

United States Patent Office 3,508,075
Patented Apr. 21, 1970

3,508,075
SIGNAL PROCESSING APPARATUS AND METHOD FOR FREQUENCY TRANSLATING SIGNALS

Donald J. Savage, 605 Tennis Ave., Ardsley, Pa. 19038

Filed May 8, 1967, Ser. No. 637,885
Int. Cl. H03k 5/20
U.S. Cl. 307—233 20 Claims

ABSTRACT OF THE DISCLOSURE

A frequency translator for processing signals having simple or complex waveforms including a differential amplifier for providing a pair of signals, one being the inverse of the other and each being indicative of the difference in amplitudes between the waveform which is to be downshifted in frequency and a frequency translation signal; an amplifier connected to receive and amplify the difference signal; a pair of similarly poled diodes connected to receive the amplified difference signals; and a summing and differential amplifier connected to receive the diode signals and provide, first, a translator output signal equal to the sum of the diode signals and, second, a pair of complementary feedback signals equivalent to the respective differences between the diode signals, which feedback signals are applied through the amplifier to the diodes.

STATEMENT OF GOVERNMENT INTEREST

The invention described herein may be manufactured and used by or for the Government of the United States of America for governmental purposes without the payment of any royalties thereon or therefor.

BACKGROUND OF INVENTION

It is often desirable or necessary in signal analysis to translate downwardly the frequency spectrum of the signal being studied. Conventional frequency translators are of the general type wherein the signal to be translated downwardly is first applied to a mixer for heterodyning with a carrier signal of greater frequency. The output of the mixer is filtered to obtain the lower sideband signal, which signal is an inversion of the signal being studied. The filtered lower sideband signal is then translated to one having the desired frequency band by applying it to a second mixer for heterodyning with a second carrier. The output of the second mixer is filtered to obtain the lower sideband signal whose frequency spectrum is inverted from that of the first lower sideband signal and is similar to that of the signal being studied. The output signal includes three unknown phase shift terms introduced by the input and the two carrier signals. Unfortunately, the double inversion of the signal being studied introduces errors which in addition to the cumulative errors introduced by twice repeating the heterodyning process distorts the output waveform to an undesirable degree. Such a system does not preserve the relative amplitudes of the frequency spectra of the signal under study over a sufficiently wide range. Hence, known frequency translators are unsuitable for use in translating complex waveforms downwardly in frequency. Further, known translators also include costly filters, and some further require expensive phase shifting apparatus.

SUMMARY OF INVENTION

It is a general purpose of this invention to provide a more accurate frequency translator for translating signals having simple or complex waveforms from an upper frequency band to a lower frequency band in one operation without inversion of the frequency spectrum. It is an object of this invention to provide apparatus usable as a frequency translator which is less costly to build, which has a fewer number of parts and has a larger dynamic range with unusual linearity so that distortion products are low. Another object of the invention is to provide a frequency translator wherein the need for critical filters is eliminated and the original frequencies of the input signals to the translator are moved out of the band of interest in the output signal thereof.

The general purpose and the objects of the invention are, in brief, accomplished by providing a translator including a differential amplifier adapted to receive the signal under study and a frequency translation signal for providing a pair of signals, one being the inverse of the other and each being indicative of the difference between the amplitudes of the input signals; a pair of similarly poled diodes connected to receive the difference signals; a summing amplifier connected to receive and add the portions of the signals passed by the diodes for providing an output signal indicative of the sum thereof; and a differential amplifier connected to the diodes for providing to the diodes complementary feedback signals equivalent to the difference between the amplitudes of the output signals from the diodes.

DESCRIPTION OF THE PREFERRED EMBODIMENT

Figure 1:
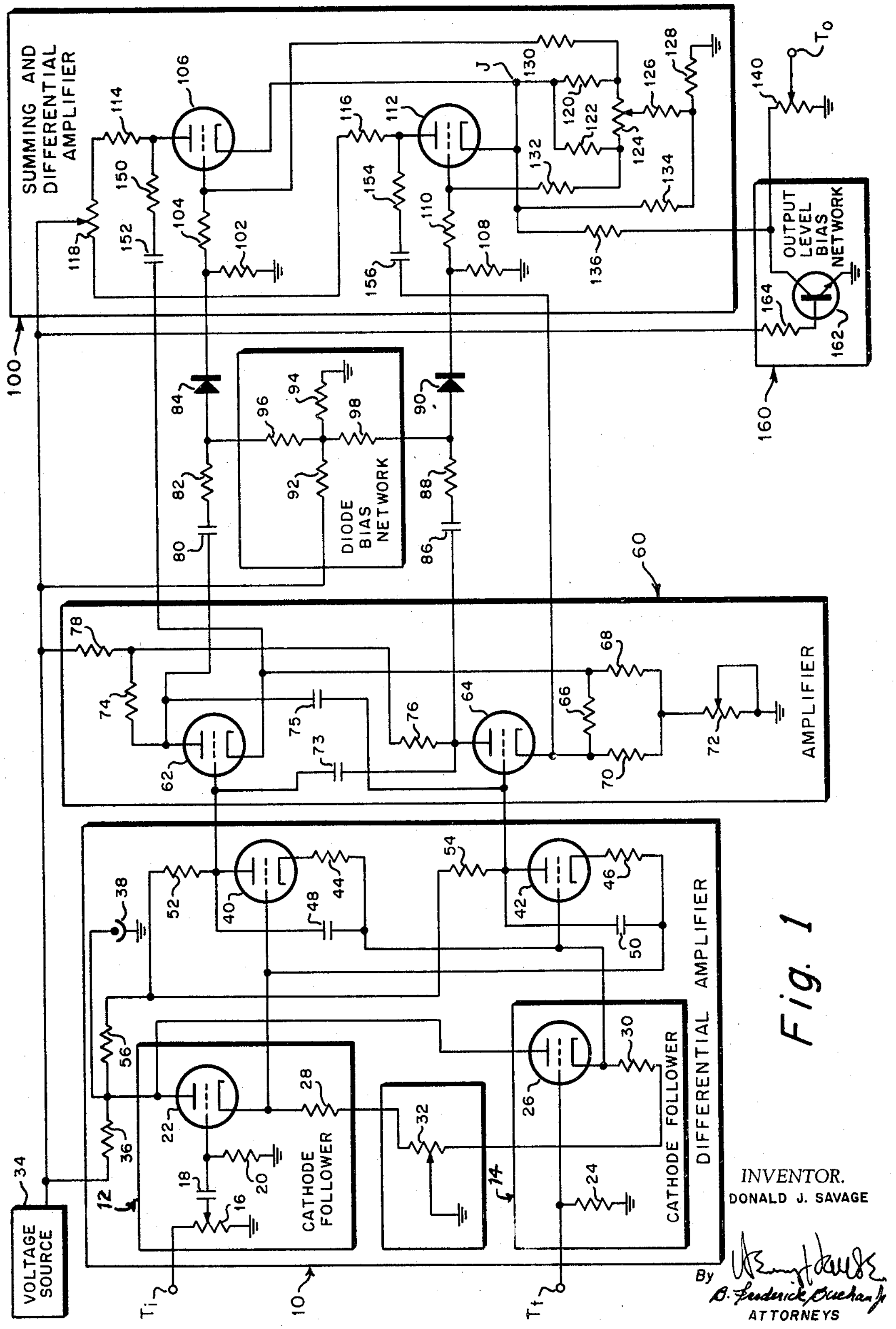
FIG. 1 is a schematic diagram of a device according to the invention.

Referring now to the device of FIG. 1, a signal whose waveform is to be frequency translated and a frequency translating signal, hereinafter more fully discussed, are applied to the input terminals $T_i$ and $T_t$ of a differential amplifier 10 and are fed to respective cathode followers 12 and 14. The signal to be translated is applied via terminal $T_i$ to one terminal of a grounded potentiometer 16, and the signal appearing at the center tap thereof is applied through a capacitor 18 and across a grounded resistor 20 to the grid of a triode 22. Similarly, in the cathode follower 14, the frequency translating signal provided by a source, not shown, is applied via terminal $T_t$ across a grounded resistor 24 to the grid of a triode 26. The cathodes of the triodes 22 and 26 are each connected through respective resistors 28 and 30 to respective terminals of a potentiometer 32 having an adjustable, grounded center tap. The plates of the triodes 22 and 26 are connected together and to a power supply such as a source of regulated D.C. voltage 34 through a resistor 36.

The output signal of the cathode follower 12 appearing at the cathode of the triode 22 is directly applied to the grid of a triode 40, and the output signal of the cathode follower 14 appearing at the cathode of the triode 26 is directly applied to the grid of a triode 42. The cathode of the triode 40 is connected through a resistor 44 to the cathode of the triode 26, and the cathode of the triode 42 is connected through a resistor 46 to the cathode of the triode 22. In order to neutralize the Miller effect, capacitors 48 and 50 are respectively connected between the plate of the triode 40 and the cathode of the triode 26 and between the plate of the triode 42 and the cathode of the triode 22. The plates of the triodes 40 and 42 are connected through respective resistors 52 and 54 to a resistor 56 which, in turn, is connected through the resistor 36 to the D.C. voltage source 34.

The differential amplifier 10 provides a pair of output signals which appear at the plates of the triodes 40 and 42 and which are each equivalent to the instantaneous difference in amplitudes of the input signals applied to the triodes 22 and 26 of the cathode followers 12 and 14, one signal being the inverse of the other. To insure that the output signals of the amplifier 10 are relatively inverse, it is desirable that the triodes 40 and 42 be matched and that the pairs of resistors 52 and 54, and 44 and 46 be matched within 1%. A balance in the operation of the cathode followers 12 and 14 may be achieved by adjusting the potentiometer 32.

The pair of difference signals is fed to a balanced, dual-channel amplifier 60, and each signal is directly applied to a respective one of the grids of triodes 62 and 64. The cathodes of the triodes 62 and 64 are interconnected through a circuit including a resistor 66 connected in parallel with a pair of serially connected resistors 68 and 70. The junction between the resistor 68 and 70 is connected to ground through a potentiometer 72 having an adjustable, grounded center tap. The plates of the triodes 62 and 64 are connected through respective resistors 74 and 76 to one terminal of a resistor 78 whose other terminal is connected to the D.C. voltage source 34. The size of resistor 66 can affect the operation of the amplifier 60 in that, if the resistance is too small, the gain of the amplifier 60 drops and in that, if the resistance is too large, distortion increases beyond desirable levels. It has been found that if the operation of the amplifier 60 is not balanced, undesirably large intermodulation products appear.

The amplified difference signal appearing at the plate of the triode 62 is applied through a serially connected coupling capacitor 80 and a resistor 82 to the anode of a diode 84, while the relatively inverted, amplified difference signal appearing at the plate of the triode 64 is applied through a serially connected coupling capacitor 86 and resistor 88 to the anode of a diode 90. The anodes of the diodes 84 and 90 are biased by a diode bias network including a resistor 92 having one end connected to the voltage source 34 and the other end connected to a grounded resistor 94. The anodes of the diodes 84 and 90 are connected through respective resistors 96 and 98 to the junction between the resistors 92 and 94.

The capacitors 80 and 86 function to prevent application of the D.C. plate voltages in the amplifier 60 to the anodes of the diodes 84 and 90. Therefore, the difference signals applied to the diodes 84 and 90 appear to vary over a range of positive and negative values preferably referenced to ground. The diodes 84 and 90 function to rectify the difference signals and pass only the relatively positive portions of the respective difference signals received thereby.

The signals passed by the diodes 84 and 90 are fed to summing and differential amplifier 100. The cathode of the diode 84 is connected to a grounded resistor 102 and also through a resistor 104 to the grid of a triode 106. Similarly, the cathode of the diode 90 is connected to a grounded resistor 108 and also through a resistor 110 to the grid of a triode 112. The plates of the triodes 106 and 112 are connected through respective resistors 114 and 116 to the terminals of a potentiometer 118 whose center tap is connected to the voltage source 34. The cathodes of the triodes 106 and 112 are connected together at a junction J which, in turn, is connected to a pair of resistors 120 and 122. The resistors 120 and 122 are connected to the terminals of a potentiometer 124 whose center tap is connected to ground through two serially connected resistors 126 and 128. The terminals of the potentiometer 124 are further connected through resistors 130 and 132 to respective ones of the grids of the triodes 106 and 112.

Junction J is also connected through a resistor 134 to the junction between the resistors 126 and 128. The sum output signal of the amplifier 100 appearing at junction J is fed through a resistor 136 to a grounded potentiometer 140 whose center tap is connected to an output terminal $T_0$ for the frequency translator shown in FIG. 1. As will be hereinafter shown, the translator output signal appearing at the terminal $T_0$ will ordinarily be filtered to obtain the envelope of the waveform of the output signal which corresponds to the waveform of the input signal applied to terminal $T_i$ and is translated downwardly in frequency.

The summing and differential amplifier 100 also functions to provide the amplifier 60 with a pair of inversely related feedback signals appearing at respective ones of the plates of the triodes 106 and 112 and each being equivalent to the instantaneous difference between the amplitudes of the portions of the signals passed by the diodes 86 and 90. The plate of the triode 106 is connected through a serially connected resistor 150 and capacitor 152 to the cathode of the triode 62. Similarly, the plate of the triode 112 is connected through a serially connected resistor 154 and capacitor 156 to the cathode of the triode 64. This feedback arrangement enables the linearization of errors introduced by the diodes 84 and 90. The diodes 84 and 90 thereby provide to the summing and differential amplifier 100 the absolute value of the relative difference between the amplitudes of the input signals to the differential amplifier 10 with great linearity. It is preferred that the linearity of the device of FIG. 1 be within ranges extending to 40 dbv. or 70 dbv.

In order that the translator output signal may vary positively from a reference level such as zero or ground, an output level bias network 160 is provided which includes a transistor 162 having its emitter grounded and its collector connected to a junction between the resistor 136 and the potentiometer 140. The base of transistor 162 is connected through a biasing resistor 164 to the voltage source 34. The network 160 functions as a constant current drain, the transistor 162 being biased into a state of conduction. The magnitude of the drain is set so as to bring the minimum anticipated voltage at the collector of the transistor 162 to a level close to the desired reference level.

It is preferred that the heater elements of the triodes in the circuit of FIG. 1 be positively biased to avoid including an undesirable ripple in the output signal of the translator. Suitable values for the elements of the circuit of FIG. 1 utilizing a +400 volts regulated D.C. voltage supply 34 appear below in Table 1.

TABLE 1

| Resistor or Potentiometer * | Value in Ω | Resistor or Potentiometer * | Value in Ω | Resistor or Potentiometer * | Value in Ω |
|---|---|---|---|---|---|
| 16 * | 0.5 meg. | 72 * | 75K | 116 | 62K |
| 20 | 390K | 74 | 220K | 118 * | 10K |
| 24 | 390K | 76 | 220K | 120 | 300K |
| 28 | 2K | 78 | 22K | 122 | 300K |
| 30 | 2K | 82 | 50K | 124 * | 470K |
| 32 * | 2K | 88 | 50K | 126 | 2.2K |
| 36 | 20K | 92 | 2 meg. | 128 | 2.2K |
| 44 | 3,600 | 94 | 10K | 130 | 300K |
| 46 | 3,600 | 96 | 300K | 132 | 300K |
| 52 | 220K | 98 | 300K | 134 | 4.7K |
| 54 | 220K | 102 | 470K | 136 | 11K |
| 56 | 22K | 104 | 470K | 140 * | 10K |
| 66 | 8,200 | 108 | 470K | 150 | 51K |
| 68 | 51K | 110 | 470K | 154 | 51K |
| 70 | 51K | 114 | 62K | 164 | 2.9.5 meg. |

| Capacitor | Value |
|---|---|
| 18 | 0.05 μfd. |
| 48, 50 | 1.5 μμfd. |
| 73, 75 | 1.5 μμfd. |
| 80 | 0.02 μfd. |
| 86 | 0.02 μfd. |
| 152 | 0.25 μfd. |
| 156 | 0.25 μfd. |
| | ----------- |

| Reg. Tube | Triodes | Diodes | Transistors | Type |
|---|---|---|---|---|
| | 22, 26 | | | 12AT7 |
| | 40, 42 | | | 12AX7 |
| | 62, 64 | | | 12AU7 |
| | 106, 112 | | | 12AX7 |
| | | 84 | | IN39A |
| | | 90 | | IN39A |
| | | | 162 | 2N117 |
| 38 | | | | OB2 |

Figure 2:
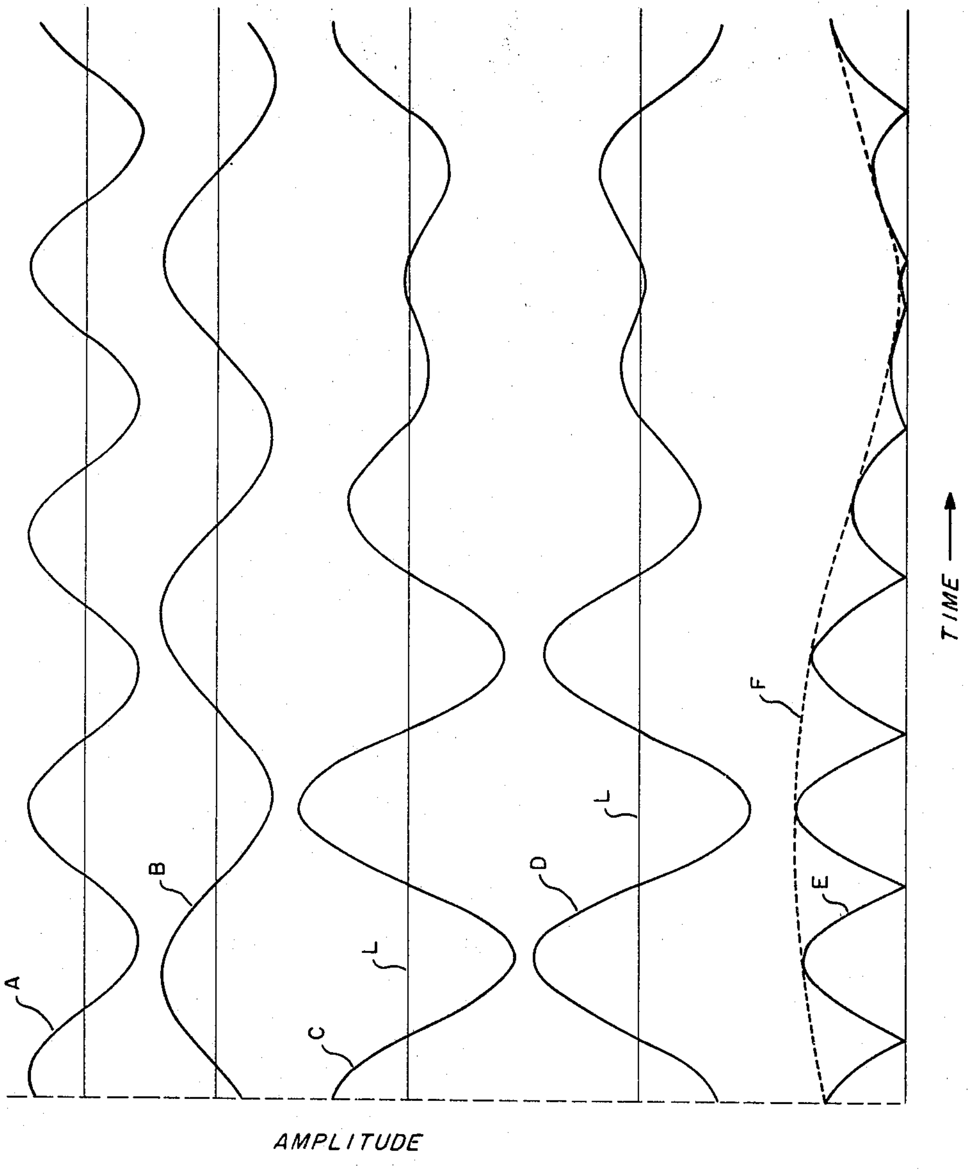
FIG. 2 represents an amplitude-time diagram of various representative waveforms postulated to be present in the device of FIG. 1.

Referring now to the amplitude-time diagrams of FIG. 2, certain graphically plotted waveforms are shown in order that the operation of a device embodying the invention, such as the circuit of FIG. 1, may be better understood. Let it be supposed that it is desirable to study a signal having a sinusoidal waveform and a frequency of $4f$, waveform A of FIG. 2. Suppose, further, that it is desirable that the waveform A be translated downwardly in frequency so that it has a frequency of $f$. A frequency translation signal which has a sinusoidal waveform, waveform B of FIG. 2, and a frequency of $3f$, i.e., the difference between that frequency present and that desired in the waveform under study, is applied to the terminal of $T_t$ of the device of FIG. 1. The differential amplifier 10 provides in response to the input signals being received a pair of inversely related waveforms C and D which are each equivalent to the instantaneous difference between the amplitudes of the input signals and vary positively and negatively relative to a D.C. bias level L. For the sake of simplicity, the gain of all the amplifiers has been assumed to be equal to one. At a given instant in time, the amplitude of the waveform C represents the amplitude of waveform A minus the amplitude of waveform B. Similarly, the amplitude of the waveform D represents the amplitude of waveform B minus the amplitude of the waveform A. It therefore appears that the waveforms C and D are inversely related.

The waveforms C and D are applied to the anodes of the diodes 84 and 90. The values of the resistors 92, 94, 96 and 98 in the diode bias network of FIG. 1 have been so chosen that the diodes 84 and 90 will conduct whenever the respective one of the waveforms C and D fed thereto exceeds the D.C. bias level L present at the plates of the triodes 62 and 64. Since the waveforms C and D are inversely related, the diodes 84 and 90 will alternatively be in states of conduction. The signals appearing at the cathodes of the diodes 84 and 94 are added at the junction J and the resultant sum signal, waveform E, has an envelope, waveform F, which has the desired frequency, which is the difference between the frequencies of the waveforms A and B, and substantially has the desired sinusoidal shape. The slight distortion appearing in waveform F can be removed by filtering. In effect, the difference signals, waveforms C and D, have been full wave rectified.

It can easily be demonstrated by the graphical plotting process inferentially suggested above that reducing the amplitude of the signal to be studied, waveform A, by a factor such as 2 will cause the amplitude of the envelope, waveform F, as measured relative to a symmetrically positioned reference level, to be reduced by the selected factor of 2. The phase and the frequency of the resulting envelope of decreased amplitude will be unchanged. Hence, it is apparent that the device of FIG. 1 will preserve the relative amplitudes of the various frequency components of a signal whose waveform is to be translated downwardly in frequency even if the particular amplitude should differ from that of the frequency translating signal, waveform B.

Figure 3:
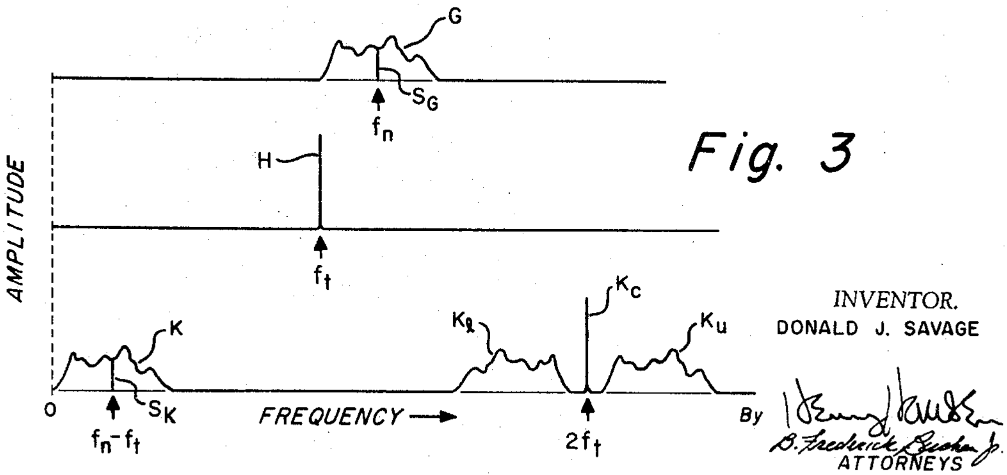
FIG. 3 represents an amplitude-frequency diagram of other representative input and output waveforms of the device of FIG. 1.

Referring now to the amplitude-frequency diagrams of FIG. 3, let it be assumed that the input signal applied to terminal $T_i$ has a frequency spectrum G, the bandwidth of the input signal being measured along the frequency axis. The spectral components of the signal, such as $S_G$ having a frequency $f_n$, each have relative amplitudes in accordance with the shape of the frequency spectrum G. If there is applied to terminal $T_t$ a frequency translating signal which has a substantially pure sinusoidal waveform having a frequency spectrum H principally including the fundamental frequency, $f_t$, of the sinusoidal translating signal, the sum signal at junction J of the device of FIG. 1, waveform E of FIG. 2, will have a frequency spectrum K which has the same shape as does frequency spectrum G wherein each of the spectral components of the spectrum K has been translated downwardly in frequency. For example, the spectral component $S_K$ of spectrum K corresponds in amplitude and relative position to spectral component $S_G$ of spectrum G and has a frequency equal to $f_n$ minus $f_t$ in accordance with the above discussion relating to FIG. 2. Note that the order and the relative amplitudes of each of the spectral components has been preserved and that a non-inverted spectrum K has been produced. It is postulated that there are present in the output signal a plurality of harmonic upper and lower sideband signals such as $K_u$ and $K_e$, positioned symmetrically on either side of the harmonic spectral components such as $K_c$ having a frequency of $2f_t$. Of course, the higher order spectral components can easily be eliminated from the output signal of the translator by using a non-critical, low pass filter since upper and lower sideband signals symmetrically located on either side of a component having a frequency $f_t$ equal to that of the translating signal do not appear.

Figure 4:
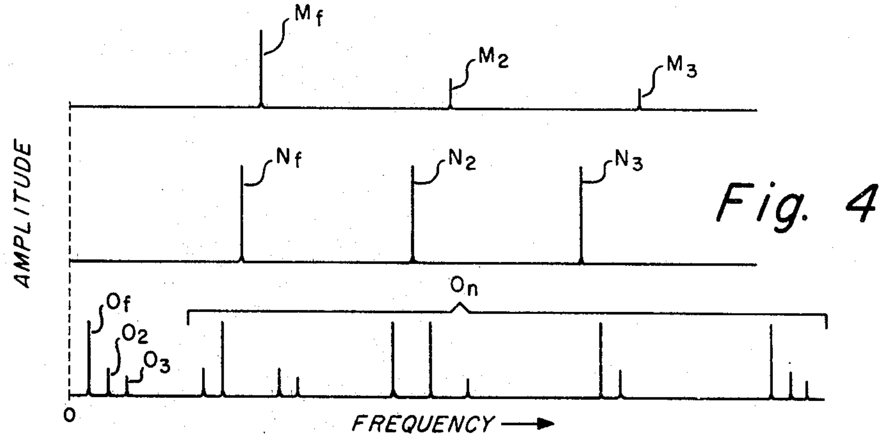
FIG. 4 represents an amplitude-frequency diagram of still other representative input and output waveforms of the device of FIG. 1.

Referring now to the amplitude-frequency diagrams of FIG. 4, let it be assumed that a signal having a complex waveform including a plurality of harmonic spectral components, $M_f$, $M_2$ and $M_3$, of significant relative amplitudes is to be translated downwardly in frequency. It has been found desirable to utilize a frequency translating signal having a like plurality of harmonic spectral components, $N_f$, $N_2$ and $N_3$, of substantially equal relative amplitude. Thus as indicated above in connection with the waveforms of FIG. 2, a spectral component $O_f$ will appear in the output sum signal which has an amplitude equivalent to that of $M_f$ and a frequency equal to the difference between the frequencies of the spectral component $M_f$ of the signal to be translated and the spectral component $N_f$ of the translating signal. Similarly, the output signal will include a spectral component $O_2$ having an amplitude equivalent to that of $M_2$ and a frequency equal to the difference between those of the spectral components $M_2$ and $N_2$, which frequency is twice that of $O_f$. Since the spectral components $N_f$ and $N_2$ have equal amplitudes, the relative amplitude of the second harmonic spectral component of the input signal to be translated is preserved in the spectral component $O_2$ of the downshifted output signal because, as indicated above in connection with FIG. 2, if the amplitude of waveform A is decreased, the amplitude of waveform B remaining the same, the relative amplitude of the envelope, waveform F, will be correspondingly decreased by the same factor. A spectral component $O_3$ having an amplitude equivalent to that of component $M_3$ and a frequency equal to the difference between those of the components $M_3$ and $N_3$, which difference frequency equals three times that of component $O_f$, will also be present in the translator output signal appearing at terminal $T_o$. Thus, there has been provided a signal having harmonically related spectral components having lower frequencies than those of the signal to be translated and having the same relative amplitudes as do those of the signal to be translated. The higher order spectral components $O_n$ having frequencies equal to those which result from the various other sum and difference combinations of the frequencies of the components $M_f$, $M_2$ and $M_3$ on one hand and $N_f$, $N_2$ and $N_3$ on the other can be filtered from the translator output signal by the use of a non-critical, low pass filter.

Figure 5:
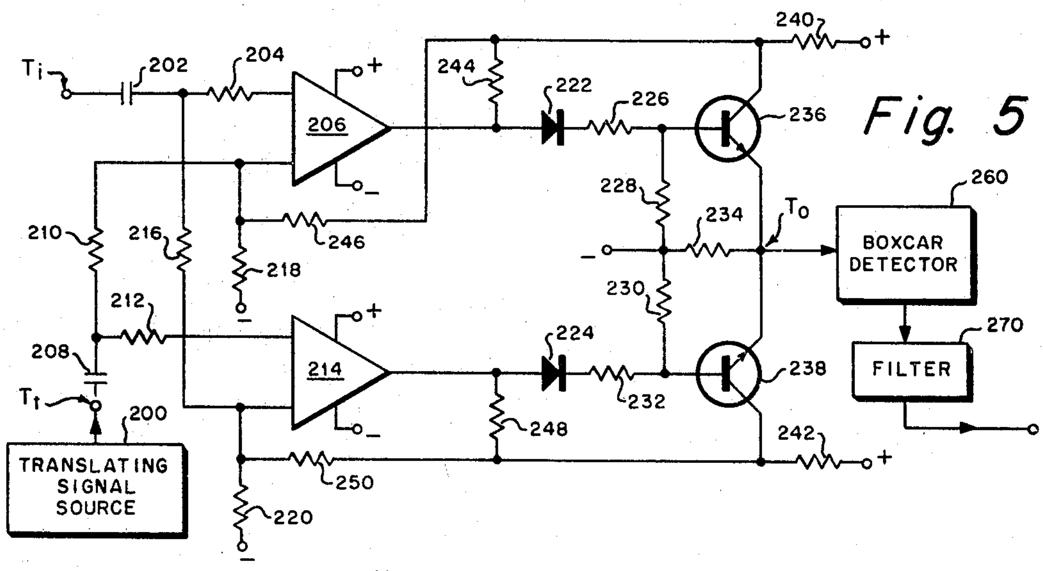
FIG. 5 is a block and schematic diagram of another embodiment of the invention.

Referring now to the modified embodiment of a frequency translator shown in FIG. 5, the input signal whose waveform is to be translated downwardly in frequency is applied to an input terminal $T_i$ and a frequency translating signal provided by a translating signal source 200 is applied to an input terminal $T_t$. As indicated above the frequency translating signal may be a pure sine wave of a selected or predetermined lower frequency than that of the input signal applied to the terminal $T_i$ when translating signals with a simple waveform and should be a signal having a complex frequency spectrum characterized by a plurality of harmonic spectral components of substantially the same amplitude when translating signals having complex waveforms including harmonically related spectral components of significant amplitude. One way of providing such a signal with harmonic spectral components is to utilize a plurality of oscillators each providing one of the spectral components. Another suitable way is to overdrive the generator of a sine wave having the desired fundamental frequency and clip its output.

Terminal $T_i$ is connected through a serially connected capacitor 202 and a resistor 204 to a first of two input terminals of a high gain, wideband D.C. differential amplifier 206 which provides at its output a difference signal equivalent to the difference between the amplitudes of the signals applied to its input terminals. The terminals $T_t$ is also connected through a capacitor 208 and resistor 210 to the second input terminal of the amplifier 206. A resistor 212 is connected to the junction of the capacitor 208 and the resistor 210 is connected to a first of two input terminals of another high gain, wideband D.C. differential amplifier 214 which is identical to the amplifier 206, whereby the frequency translating signal is applied thereto. Similarly, the input signal to be translated is applied to the second of the input terminals of the amplifier 214 by a resistor 216 which is connected between the input terminal and the junction between the capacitor 202 and the resistor 204. Each of the second input terminals of the amplifiers 204 and 214 is connected through respective resistors 218 and 220 to a source of negative potential. The output signals of the amplifiers 206 and 214 are each indicative of the difference between the amplitudes of the signal being studied and the frequency translating signal and, further, bear an inverse relationship to each other as do those of the differential amplifier 10 shown in FIG. 1. A suitable amplifier for use as the amplifiers 206 and 214 is shown in "μa.–702 High Gain Wideband D.C. Amplifier—Fairchild Linear Integrated Circuits," Fairchild Semiconductor, Mountain View, Calif., August 1964.

The inversely related difference signals from the amplifiers 206 and 214 are applied respectively to the anodes of a pair of diodes 222 and 224. The cathodes of the diodes 222 and 224 are connected together through the serially connected resistors 226, 228, 230 and 232. The junction between the resistors 228 and 230 is connected to a source of negative D.C. voltage and also through a resistor 234 to an output terminal $T_o$ of the translator. Thus, the signals passed by the diodes 222 and 224 are added together and the sum signal, such as waveform E of FIG. 2, appears at the output terminal $T_o$.

Additionally, a pair of transistors 236 and 238 having their emitters connected to the output terminal $T_o$ are connected to perform a function similar to that of the differential amplifier 100 of FIG. 1 whereby may be generated a pair of inversely related, feedback signals which are applied to the anodes of the diodes 222 and 224. The collector of transistor 236 is connected through a resistor 240 to a source of positive D.C. voltage, while the base thereof is connected to the junction between the resistors 226 and 228. Similarly, the collector of the transistor 228 is connected through a resistor 242 to a source of positive D.C. voltage, while the base thereof is connected to the junction between the resistors 232 and 230. The feedback difference signal appearing at the collector of the transistor 236 is applied through a resistor 244 to the anode of the diode 222 and also be a resistor 246 to the second input terminal of the amplifier 206. Similarly, the feedback difference signal appearing at the collector of the transistor 238 is applied through a resistor 248 to the anode of the diode 224 and through a resistor 250 to the second input terminal of the amplifier 214.

The above-described circuit of FIG. 5 functions as does the device of FIG. 1 to provide at the output terminal $T_o$ an output signal whose envelope, such as the waveform F of FIG. 2, is similar to the envelope of the signal to be translated and which envelope has the desired downwardly translated frequency.

Particularly in the case of complex waveforms it has been found desirable to feed the sum signal appearing at the terminal $T_o$ to a boxcar detector 260 which functions to periodically sample the level of the output appearing at terminal $T_o$, store that value and provide an output signal which is equivalent to the value of the last-stored signal. The output signal of the boxcar detector 260 is fed to a low-pass filter 270 which, in effect, functions to provide an output signal which varies in accordance with the envelope of the sum signal appearing at the terminal $T_o$.

It is contemplated that the devices of FIGS. 1 and 5 can also be used as an extremely linear envelope detector. This is accomplished by grounding the input terminal $T_t$ and applying the selected signal to the input terminal $T_i$. In effect, a frequency translating signal having a constant amplitude and a frequency of zero is applied to the terminal $T_t$. A low pass filter of desired characteristics is utilized to filter all but the envelope from the signal appearing at the output terminal $T_o$.

The invention therefore has enabled the provision of a greatly improved frequency translating device which is capable of translating both simple and complex waveforms downwardly in frequency while preserving the shape of the waveform. Such devices as described above may be utilized to frequency translate complex waveforms including square, triangular, and repetitive irregular. As indicated above, the necessity for utilizing costly filters has been obviated.

It should be understood, of course, that the foregoing disclosure relates only to preferred embodiments of the invention and that numerous modifications or alterations may be made without departing from the spirit and scope of the invention as set forth in the appended claims.

What is claimed is:

1. Apparatus for processing signals comprising:
first means for providing a differential signal equivalent to the instantaneous difference between the amplitudes of first and second input signals received thereby;
second means connected to said first means for receiving said difference signal and providing an output signal which is a full-wave rectification of said difference signal; and
low-pass filter means connected to said second means for receiving said output signal and providing a filtered output signal which varies in accordance with the envelope of said signal received thereby.

2. Apparatus according to claim 1 further including:
means connected to said first means for providing thereto one of said input signals having a frequency less than that of the other of said input signals.

3. Apparatus according to claim 1 further including:
means connected to said first means for providing thereto one of said input signals having a plurality of harmonically related spectral components of similar amplitudes.

4. Apparatus according to claim 1 further including:
boxcar detector means connected between said filter means and said second means for receiving said output signal, said detector means sampling said output signal at periodic intervals, storing the sampled values of said signal during said intervals and providing to said filter means an output signal having a level equivalent to the level of the last sampled value of said signal received thereby.

5. Apparatus according to claim 4 further comprising:
said first means including first differential amplifier means for providing a pair of inversely related difference signals which are each equivalent to the instantaneous difference between the amplitudes of the first and second input signals received thereby:
said second means including similarly poled, first and second diode means each connected to said first differential amplifier means for receiving a respective one of said difference signals, each said diode means providing a diode output signal; and said second means further including summing means connected to said first and second diode means for receiving said diode output signals and providing a sum output signal which is equivalent to the sum of said diode output signals and which is said second means output signal.

6. Apparatus according to claim 5 further including: means connected to said differential amplifier means for providing thereto one of said input signals having a frequency less than that of the other of said input signals.

7. Apparatus according to claim 5 further including: means connected to said differential amplifier means for providing thereto one of said input signals having a plurality of harmonically related spectral components of similar amplitudes.

8. Apparatus according to claim 5 further including: boxcar detector means connected between said filter means and said summing means for receiving said sum output signal of said summing means, said detector means sampling said sum output signal at periodic intervals, storing the sampled values of said signal during said intervals and providing to said filter means an output signal having a level equivalent to the level of the last sampled value of said signal received thereby.

9. Apparatus according to claim 5 wherein said first differential amplifier means includes:

a pair of high gain, wideband differential amplifiers each having first and second input terminals for receiving said pair of input signals and each providing a respective one of said inversely related difference signals.

10. Apparatus for processing signals comprising:

first differential amplifier means for providing a pair of inversely related difference signals with each equivalent to the instantaneous difference between the amplitudes of first and second input signals received thereby:

similarly poled, first and second diode means each connected to said first differential amplifier means for receiving a respective one of said difference signals, each said diode means providing a diode output signal;

summing means connected to first and second diode means for receiving said diode output signals and providing a sum output signal equivalent to the sum of said diode output signal;

feedback means connected to said first and second diode means for receiving said diode output signals and providing a pair of inversely related feedback signals; and first and second connecting means each connected to said feedback means for receiving a respective one of said pair of feedback signals and each connected to a respective one of said first and second diode means for providing said respective feedback signals thereto.

11. Apparatus according to claim 10 wherein said feedback means includes:

second differential amplifier means connected to said first and second diode means for receiving said diode output signals and providing said pair of inversely related feedback signals each said feedback signal being indicative of the difference between the amplitudes of said diode output signals.

12. Apparatus according to claim 10 further comprising:

said first differential amplifier means including a first differential amplifier receiving the first and second input signals and providing said pair of inversely related difference signals;

said first differential amplifier means further including a balanced amplifier having dual channels and connected to said first differential amplifier for receiving and amplifying said difference signals;

said feedback means including second differential amplifier means connected to said first and second diode means for receiving said diode output signals and providing said pair of inversely related feedback signals which are indicative of the difference in amplitudes of said diode output signals; and said first and second connecting means each being connected to said second differential means for receiving a respective one of said feedback signals and each being connected to a respective one of said channels of said balanced amplifier for providing said respective feedback signal thereto.

13. Apparatus according to claim 12 further comprising:

means connected to said summing means for receiving said summing output signal and providing an output signal which varies above a predetermined level in accordance with said summing output signal.

14. Apparatus for processing signals comprising:

first differential amplifier means including a pair of high gain, wideband differential amplifiers each having first and second input terminals for receiving first and second input signals and each providing a respective one of a pair of inversely related difference signals which are each equivalent to the instantaneous difference between the amplitude of said input signals received thereby;

similarly poled, first and second diode means each connected to a respective one of said differential amplifiers for receiving a respective one of said inversely related difference signals, each said diode means providing a diode output signal;

summing means connected to said first and second diode means for receiving said diode signals and providing a summed output signal equivalent to the sum of said diode output signals;

second differential amplifier means connected to said first and second diode means for receiving said diode output signals and providing a pair of inversely related feedback signals, each of said feedback signals being indicative of the difference between the amplitudes of said diode output signals;

first and second resistor means each connected to said second differential amplifier means for receiving a respective one of said feedback signals and each connected to a respective one of said first and second differential amplifiers at a said input terminal thereof receiving the input signal which has a spectral component having the lowest frequency received by said amplifier; and third and fourth resistor means each connected to said second differential means for receiving a respective one of said feedback signals and each connected to a respective one of said first and second diode means for providing said respective feedback signal thereto at the input side thereof.

15. Apparatus according to claim 14 further including an output terminal; and wherein:

said second differential amplifier includes a pair of transistors each having a base, a collector, and an emitter, said bases of said transistors each being connected to a respective one of said first and second diode means, said emitters being connected together and to said output terminal, and said feedback signals appearing at respective ones of said collectors; and said summing means includes resistor means connected between each of said first and second diode means and said output terminal.

16. A method of processing an input signa to obtain an output signal having a waveform of substantially the same shape as that of said input signal and a downwardly shifted frequency comprising the steps of:

combining said input signal with a frequency translating signal to obtain a difference signal indicative of the difference between the amplitudes of said input signal and said frequency translation signal;

rectifying said difference signal to obtain a full wave rectification thereof; and filtering said full wave rectified difference signal to eliminate higher order spectral components and to obtain a filtered signal which substantially varies with the envelope of said full wave rectified difference signal, said filtered signal being said output signal.

17. A method according to claim 16 wherein:

said frequency translating signal has a plurality of harmonically related spectral components of similar amplitudes.

18. Apparatus for translating an input signal from an upper frequency band to a lower frequency band comprising:

means for providing a frequency translating signal;

means for combining said input signal with a frequency translating signal to provide a full-wave rectification of a difference signal indicative of the instantaneous difference between the amplitudes of said input signal and said frequency translation signal; and low-pass filter means connected to receive the output signal of said combining means for providing an output signal varying in accordance with the envelope of said full-wave rectified difference signal.

19. Apparatus according to claim 18 wherein said frequency translating signal means further comprises:

means for providing said frequency translating signal having a plurality of harmonically related spectral components of similar amplitude to each other and of frequencies different from those of an input signal having harmonically related spectral components.

20. Apparatus according to claim 18 wherein said frequency translating signal means further comprises:

means for providing said frequency translating signal having a single tone frequency different from the frequency band of the input signal.

References Cited

OTHER REFERENCES

| | | | |
|---|---|---|---|
| 2,598,491 | 5/1952 | Bergfors | 328—32 X |
| 3,034,053 | 5/1962 | Lanning et al. | 328—133 X |
| 3,316,422 | 4/1967 | Rogge | 307—235 |
| 3,328,599 | 6/1967 | Stupar | 328—146 X |

JOHN S. HEYMAN, Primary Examiner

S. D. MILLER, Assistant Examiner

U.S. Cl. X.R.

307—235, 295; 328—15, 21, 26, 133, 149

UNITED STATES PATENT OFFICE
CERTIFICATE OF CORRECTION

Patent No. 3,508,075 Dated April 21, 1970

Inventor(s) Donald J. Savage

It is certified that error appears in the above-identified patent and that said Letters Patent are hereby corrected as shown below:

Column 8, line 36, "differential" should read -- difference; Column 9, line 41, the colon should be changed to a semicolon; Column 10, line 36, the word -- output -- should be inserted after "diode"; Column 10, line 53, the word -- amplifier -- should be inserted after "differential"; Column 10, line 71, "signa" should read -- signal --.

SIGNED AND SEALED

SEP 22 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
* U.S. GOVERNMENT PRINTING OFFICE : 1969 O—366-334